United States Patent [19]

Pechacek et al.

[11] 4,432,128
[45] Feb. 21, 1984

[54] METHOD AND SYSTEM FOR INSTALLING A LAYERED VESSEL ON LOCATION

[75] Inventors: Raymond E. Pechacek; Eugene J. Clay, both of Houston, Tex.

[73] Assignee: Hahn & Clay, Houston, Tex.

[21] Appl. No.: 209,846

[22] Filed: Nov. 24, 1980

[51] Int. Cl.³ .................... B21D 39/03; E04G 3/00; B23K 31/02
[52] U.S. Cl. .................................. 29/429; 182/187; 228/184
[58] Field of Search ............. 228/184, 44.1 R; 220/3; 269/25; 29/429, 431, 446; 182/62.5, 187, 188

[56] References Cited

U.S. PATENT DOCUMENTS

| | | | |
|---|---|---|---|
| 2,724,512 | 11/1955 | Fuller | 182/187 |
| 2,960,053 | 11/1960 | Meyer | 29/431 |
| 3,374,935 | 3/1968 | Pechacek | 269/25 |
| 3,497,100 | 2/1970 | Sagara et al. | 228/184 |
| 3,774,296 | 11/1973 | Clay | 228/184 |
| 3,851,736 | 12/1974 | Westlake et al. | 29/429 |
| 3,945,236 | 3/1976 | Hooper | 228/184 |
| 4,053,971 | 10/1977 | Pechacek | 29/252 |
| 4,078,295 | 3/1978 | Koller | 29/429 |
| 4,121,747 | 10/1978 | McFatter | 29/429 |
| 4,230,255 | 10/1980 | Coulter | 228/184 |

Primary Examiner—Ervin M. Combs
Assistant Examiner—Steven E. Nichols
Attorney, Agent, or Firm—Pravel, Gambrell, Hewitt, Kirk & Kimball

[57] ABSTRACT

A method and system for installing a layered vessel wherein the method includes the steps of constructing the bottom vessel head section in an inverted position mounting the bottom head section on the vessel foundation, erecting a generally cylindrical construction frame having a plurality of annular work stations; substantially simultaneously with the erection of the cylindrical construction frame, constructing onto the bottom head a cylindrical inside shell liner and a hemispherical upper head inside liner and adding layers to the inside shell from the bottom upwardly with the addition of such layers occurring substantially simultaneously at various of the annular work stations. A system for accomplishing these steps is provided, including particular method for constructing the bottom head, and further, an annularly movable crane assembly is provided for the work stations.

10 Claims, 19 Drawing Figures

METHOD AND SYSTEM FOR INSTALLING A LAYERED VESSEL ON LOCATION

TECHNICAL FIELD

The field of this invention relates to a method and system for the construction of vessels on location.

High pressure vessels having very thick walls to withstand the stresses from such high pressure environments are essential to modern chemical plants and to the application of nuclear technology as well as other uses. Although it is within the skill of the art at this time to construct many of such vessels having a single layer structure, there are many situations where a multi-layer vessel design is desirable. Multi-layer or layered vessels are known to have several advantages over single-layer vessels. For example, a layered vessel is built up of a series of relatively thin layers with only the innermost shell or liner being necessarily manufactured to be pressure tight. The outer layers may therefore be manufactured of a less expensive material, for example, and small vent holes may be provided in order to vent a leak to the atmosphere thus preventing precipitous ruptures. Present technology relating to layered vessels is taught in, inter alia, U.S. Pat. Nos. 3,140,535; 3,374,935; 3,423,820; 3,604,587; 3,785,040 and 4,053,971, belonging to the assignee of this patent application.

An additional prospective advantage of layered vessel construction relates to the possibilities of complete field erection of extremely large pressure vessels. There is no question that the demand for extremely large pressure vessels, such as, for example, above 400 tons and even larger, is increasing. The economies of transportation costs, which include the possibility of damage enroute, make the possibility of field erection very attractive.

One solution of full field erection is to manufacture layered or other pressure vessels in sections in order to eliminate all but final fabrication and erection on location. However, very large pressure vessels necessarily comprise very large vessel sections, making final installation even of such sections of questionable advantage, particularly in terms of erection problems and the problems of fitting together layered sections of vessels. U.S. Pat. No. 3,774,296 is directed to a pressure vessel assembly and method of assembly wherein pre-fabricated pressure vessel sections are joined together in the field or at some point remote from the point of initial fabrication. U.S. Pat. No. 3,774,296 is directed to an improved method of joining together such vessel sections utilizing a plurality of arcuate inserts, two or more for each layer, which inserts are prestressed to correspond to the prestress in the layers of the vessel sections, such method substantially reducing the thickness of the welds necessary to fit together pre-fabricated vessel sections. In spite of improvements in construction such as disclosed in U.S. Pat. No. 3,774,296, problems with respect to the necessity of very heavy lifts, complicated field rigging and complicated fit-up and welding will undoubtedly increase as the required sizes of vessels increases.

SUMMARY OF THE INVENTION

It is an object of this invention to provide a new and improved method and system for the manufacture of high pressure, layered vessels on final location. The method of construction of such layered vessels on final location includes the steps of construction of the bottom head and mounting of the bottom head on the vessel foundation at the final location site; a generally cylindrical construction frame is then erected about the bottom head, the construction frame extending upwardly to substantially the final height of the vessel to be constructed. Substantially simultaneously with the erection of the cylindrical construction frame, a cylindrical inner shell liner and a hemispherical top head liner portion are mounted onto the bottom head section. And, substantially simultaneously with such preceding step, shell layers are constructed from the bottom upwardly with the addition of each layer beginning at the bottom, adjacent to the upper end of the bottom head, with such layered construction moving upwardly therefrom. In this manner, a number of actual layers of the vessel shell can be added on simultaneously at a plurality of vertically spaced, annular work stations mounted within the generally cylindrical construction frame. At least some of the layers added onto the vessel shell are continued onto the top vessel head while construction continues on additional outside layers so that the entire vessel is constructed from a number of working stations substantially at the same time.

The system for the erection of a layered vessel at final location includes a generally cylindrical vertical frame having a plurality of vertically spaced, annular work stations. An elevator is mounted with the vertical frame for raising layer plates and gores to the vertically spaced, annular work stations so that such plates can be applied to various layers of the vessel shell under construction at substantially the same time. The building system further includes a positioning crane mounted with the work stations, the positioning crane including means for raising and lowering the plates into position at said vertically spaced, annular work stations and for moving the plates radially inwardly into position for welding.

In a preferred embodiment of this invention, a crane assembly is provided for use within each of the annular work spaces or stations provided within the generally cylindrical vertical frame or tower. The crane assembly includes an annular support frame adapted for mounting in an annular space and a crane frame and mount means mounting the crane frame onto the annular support frame for circumferential movement of the crane frame about the annular support frame. A first radial mount means is mounted with the crane frame for movement radially with respect to the crane frame. A second radial mount means is attached to a hoist member and is mounted onto the first radial mount means for radial movement with respect thereto whereby the hoist member is movable annularly and in addition, a first radial distance with respect to the crane frame and a second radial distance with respect to the first radial mount means. In this manner, plates forming the layers of the vessel may be added at various radial distances from the inner shell layer.

This description of the inventions disclosed herein is intended to be a summary only. The reader is referred to the detailed description of the preferred embodiment for a full understanding of the structure and function of the inventions disclosed herein and to the claims for a description of the actual subject matter considered to be patentable.

DESCRIPTION OF THE PREFERRED EMBODIMENT

Figures 1, 13:
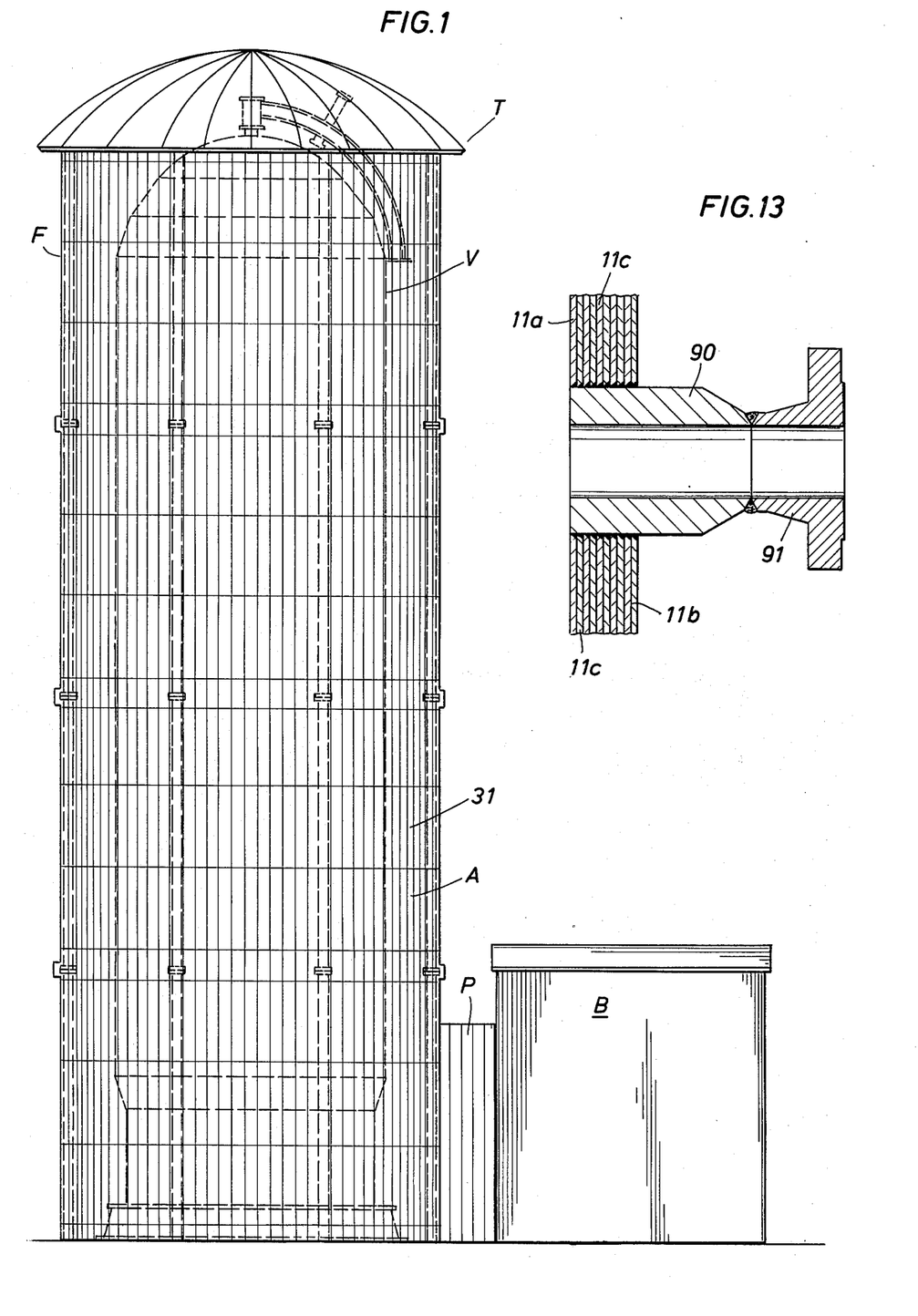
FIG. 1 is a side view illustrating the overall construction of the building system for the erection of a layered vessel, which is illustrated in imaginary lines within the vertical frame or tower of the building system, which frame contains a number of vertically spaced, annular work stations.
FIG. 13 is a side view in section of a vessel outlet welded in place in the layered vessel.
Figures 4, 10A, 10B, 14A, 14B:
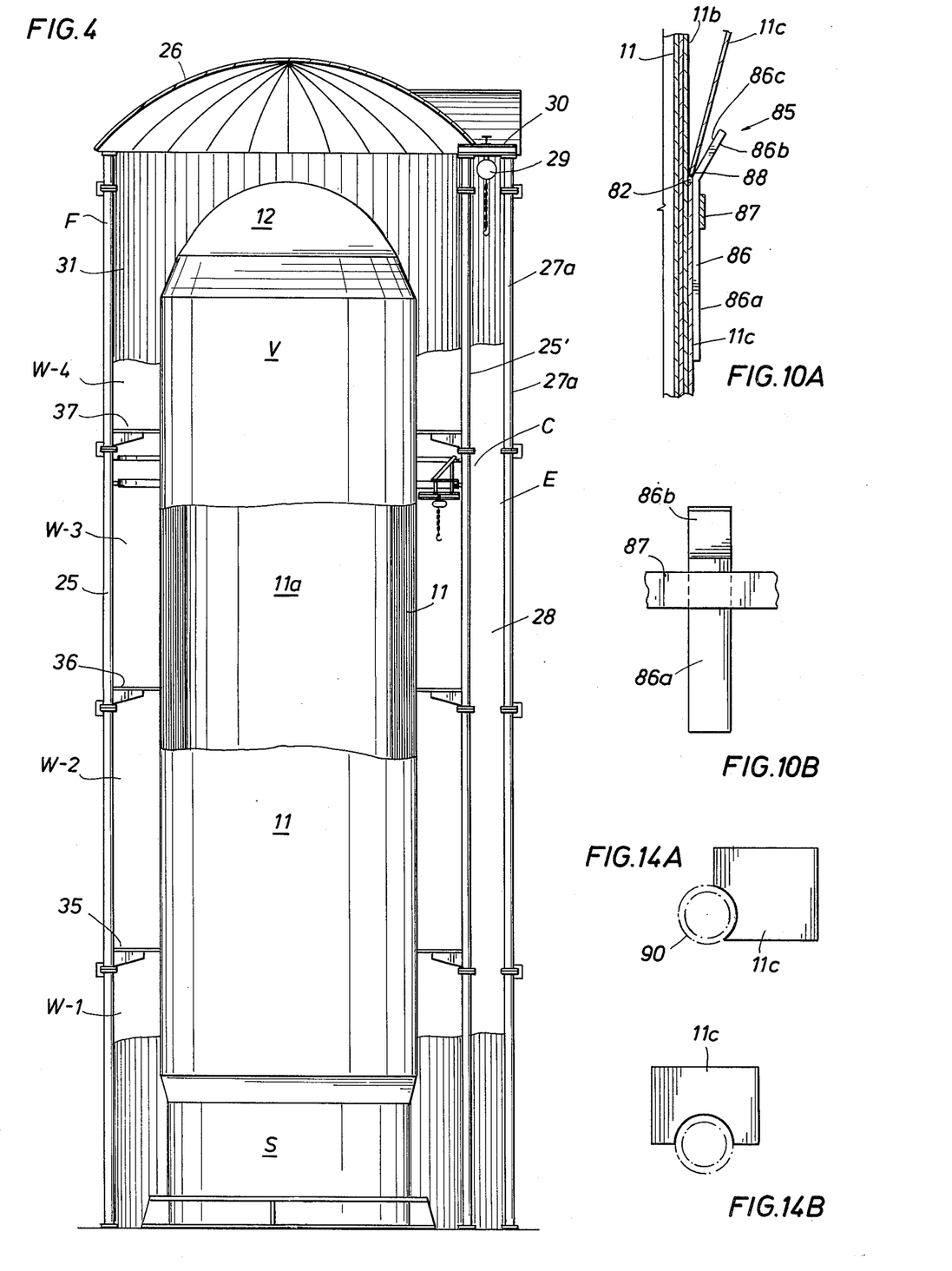
FIG. 4 is a side view partly in section of the complete vertical tower and completed vessel constructed therein.
FIG. 10A is a sectional view of a guide member for guiding into position the bottom edge of a plate being installed.
FIG. 10B is an outside or circumferential view of the band member holding such guide member in position.
FIGS. 14A-14B illustrate the application of plates to the welded outlet of FIG. 13.
Figure 12:
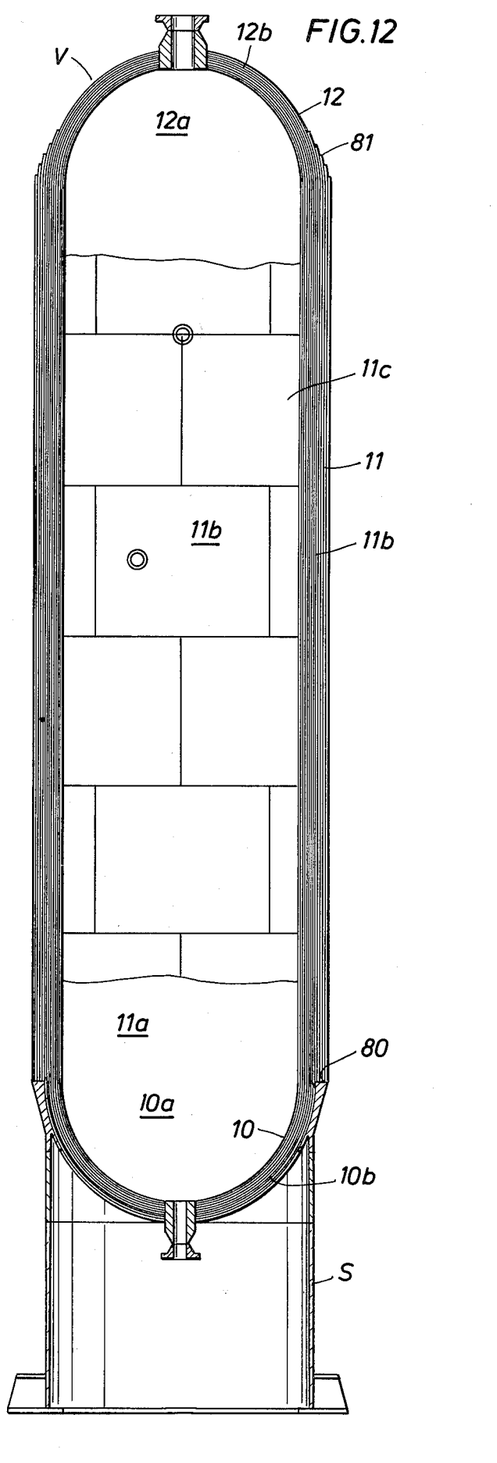
FIG. 12 is a side view in section of the completed vessel illustrating in detail the layers of the vessel.

Referring to the drawings, the letter V generally designates the multi-layer or layered vessel, which vessel is illustrated in virtually completed form in FIGS. 1, 4 and 12. In its completed form, the vessel V includes a bottom head section 10, a shell section 11 and a top head section 12. Each of the vessel sections 10, 11 and 12 are formed of an inner liner or wall and a plurality of layers formed of segmented plates. The bottom vessel section 10 thus is formed of an inner head portion or liner 10a which is joined to and virtually continuous with an inner shell portion or liner 11a and an inner top head portion or liner 12a (FIG. 12). Each of the inner head and shell portions 10a, 11a and 12a are formed of a pressure-resistant material such as a very high quality stainless steel which may also be corrosive resistant, depending upon the application. These inner portions 10a, 11a and 12a are not necessarily formed of plates and gores to be described herein but rather, are formed as virtually complete units for installation.

Figure 11:
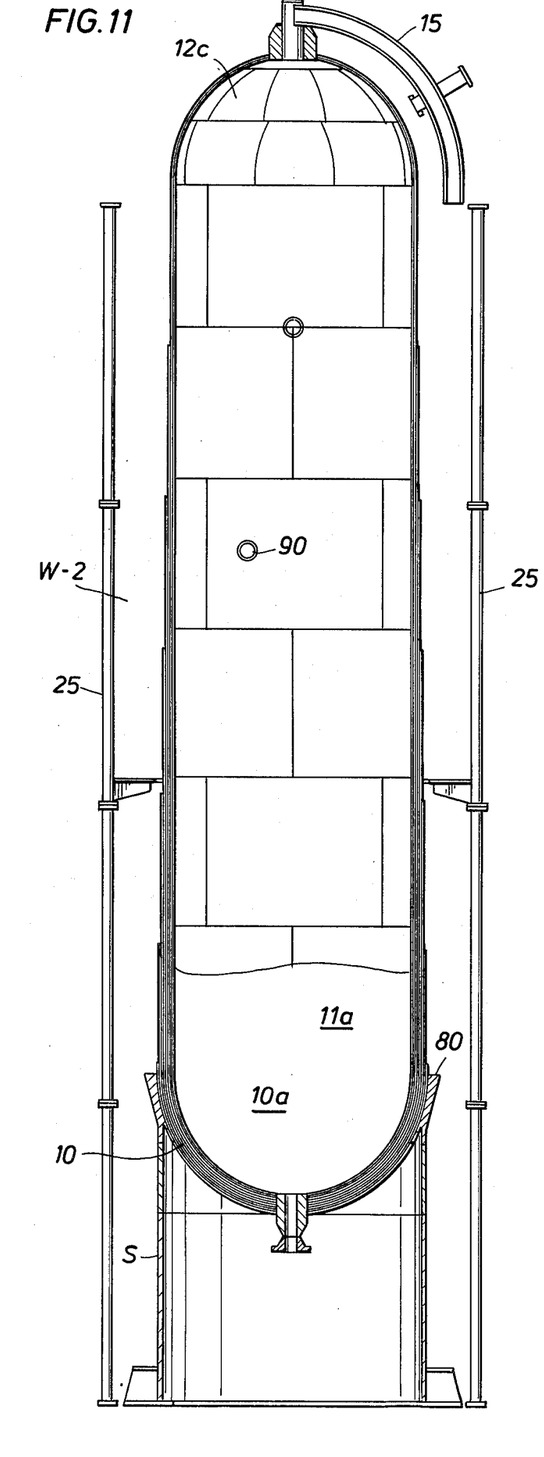
FIG. 11 is another full side view, partly in section, illustrating the vessel shell and the vertical frame partly constructed.

Typically, the vessel V in its final, upright and erected position, is mounted onto a skirt S. The outside layers of the bottom head 10 are designated as 10b and are formed of a plurality of gores 10c (FIG. 2). Similarly, the outer layers of the top head 12 are each individually designated as 12b and are formed of a plurality of gores 12c (FIG. 11). And, with respect to the vessel shell section 11, each of the outer layers is identified as 11b and is formed of a plurality of rectangular sections or plates 11c.

This invention is directed to a method and a system for the construction of the multi-layered or layered vessel V on its final location. Basically, the system generally designated as T provided for the erection of the layered vessel V at final location includes a generally cylindrical, vertical frame or tower F adapted to be mounted substantially about the vessel V in a state of partial completion. The generally cylindrical vertical frame F is of sufficient height to extend over the top of the vessel V in its completed form and is of a diameter sufficiently larger than the outside diameter of the vessel V in its completed form to provide a generally annular area A between the generally cylindrical frame F and the vessel V to be constructed therein. The system T for the erection of a vessel V further includes a fabrication building B which, in the embodiment illustrated in FIG. 1, is constructed adjacent to the frame F and connected therewith through a passageway P. It is within the scope of this invention to position the fabrication building B at a point remote from the location of the frame F. Basically, the fabrication building B is to be utilized for final forming and machining of the rectangular plates 11c, gores 10c and 12c which are welded into position during the construction of the layers of the vessel V.

Figures 3, 6:
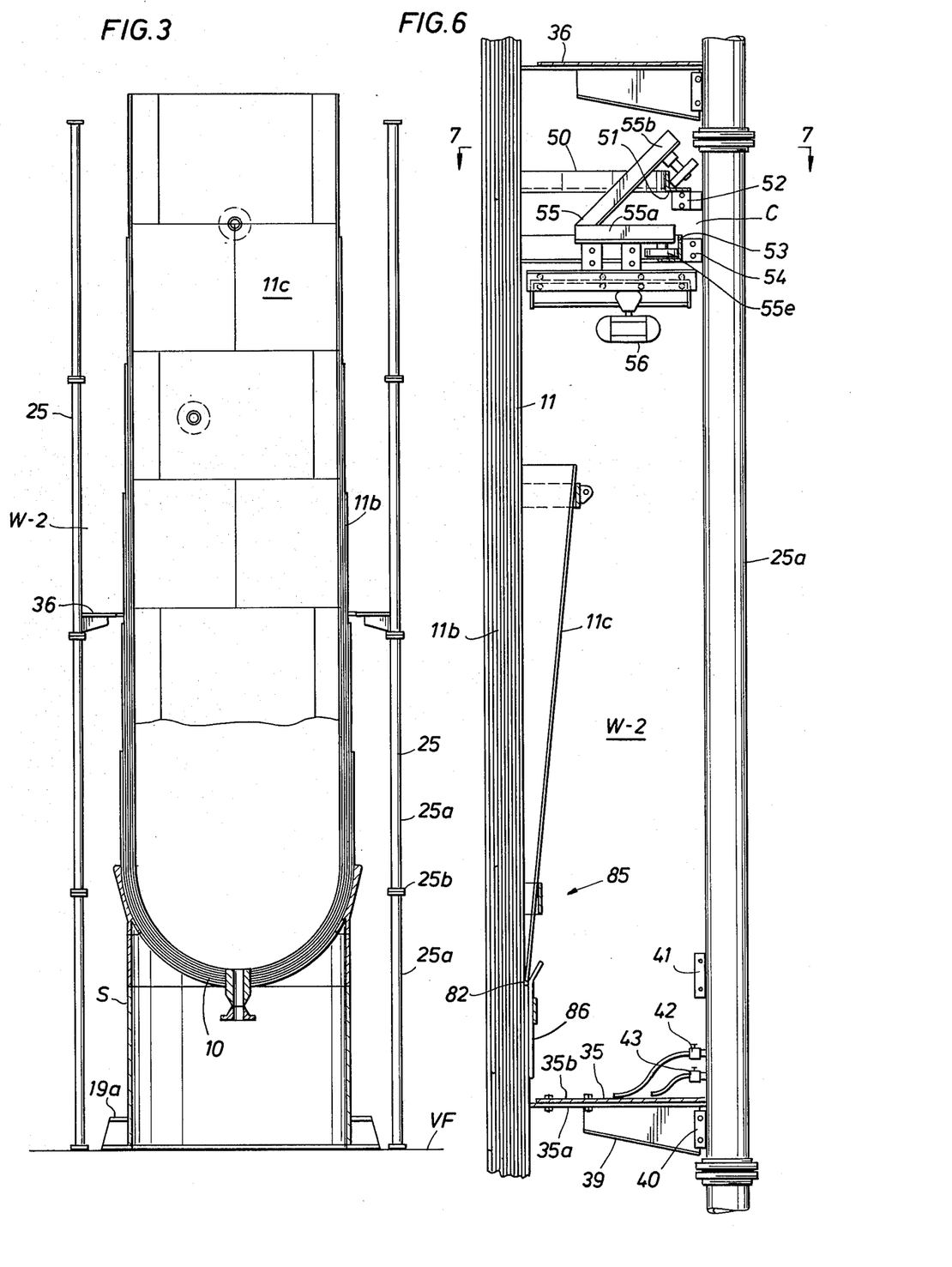
FIG. 3 is a side view partly in section of a partially completed shell section showing the vertical construction frame partially assembled.
FIG. 6 is a side view of a single annular work station.
Figure 5:
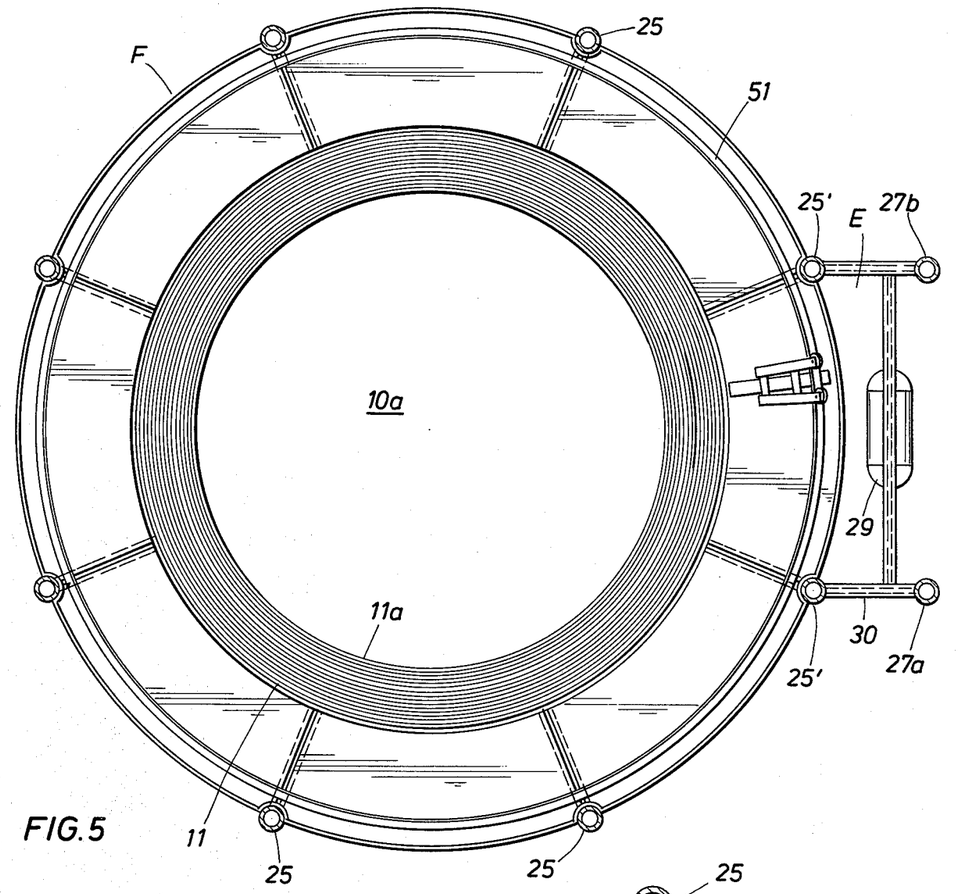
FIG. 5 is a sectional view of an annular work station and the crane and elevator for all the work stations.
Figure 7:
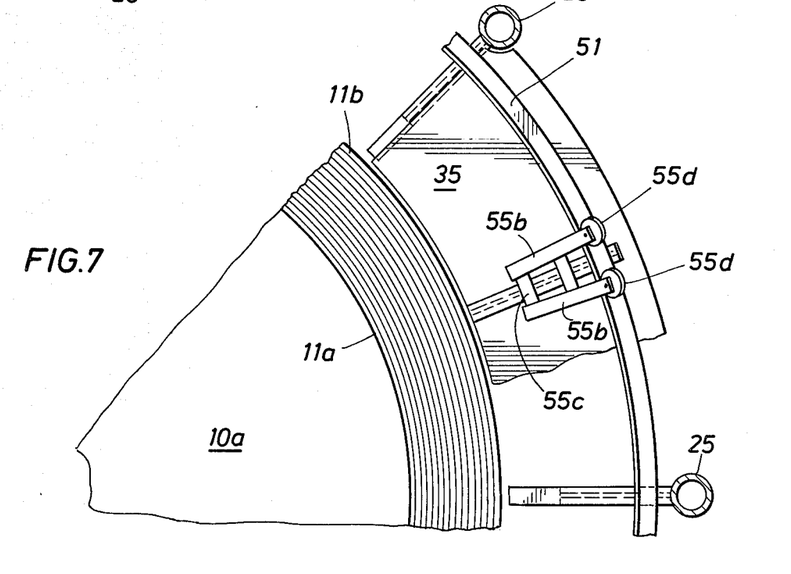
FIG. 7 is a top view taken from the same view as in FIG. 5 illustrating in greater detail the frame structure of the crane assembly for the annular work stations.
Figure 8:
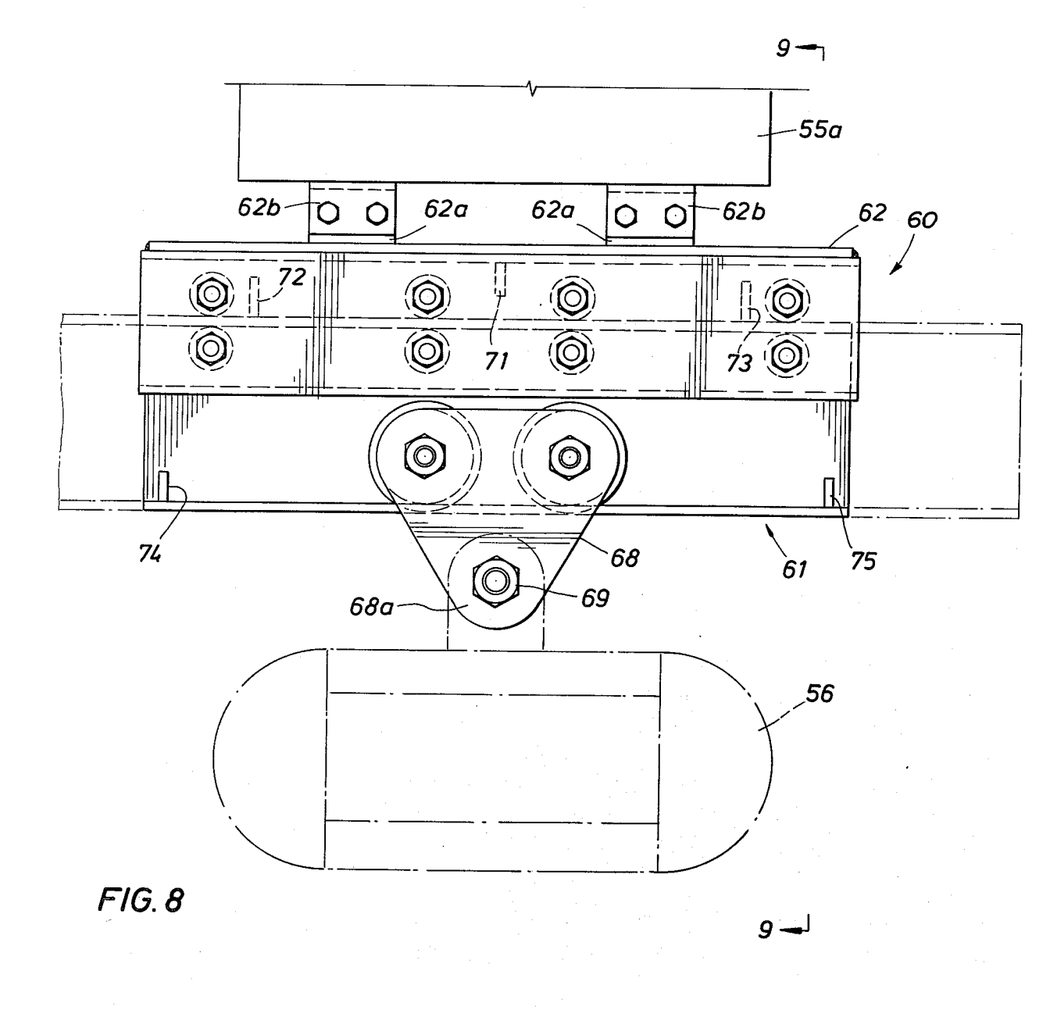
FIG. 8 is a side view partly in section of the details of the structure for providing for two step radial movement of the hoist of the crane assembly.
Figure 9:
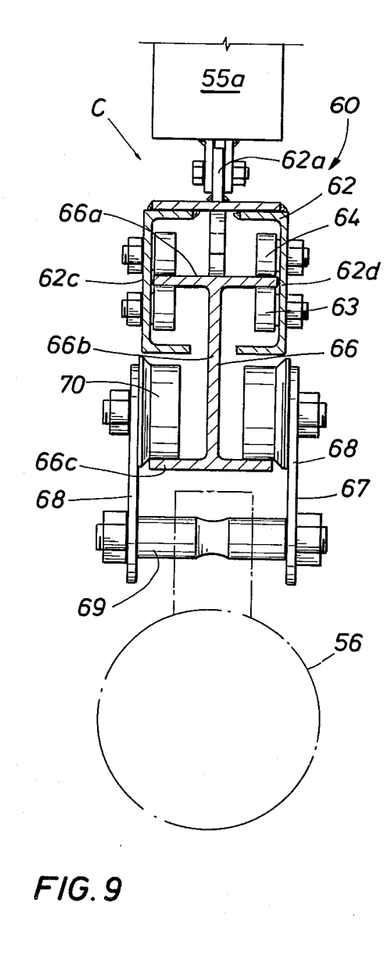
FIG. 9 is a circumferential view partly in section of further detail of the structure for two step radial movement of the crane assembly.

The building system T further includes an elevator E (FIGS. 4 and 5) which is mounted with the generally cylindrical frame F for raising the plates 11c and gores 12c to vertically spaced, annular work stations W-1, W-2, W-3 and W-4 formed within the cylindrical frame F (FIG. 4). For each work station, two crane assemblies C are positioned to cooperate with the elevator E to position plates 11c in place for welding in a manner to be described in more detail hereafter. The crane assemblies C, which are illustrated in detail in FIGS. 6 and 7, are capable of moving the rectangular plates 11c into the annular work station such as W-2 and circumferentially about the vessel being constructed to the point of installation and radially inwardly into position for welding into place.

Basically, the method of construction of the vessel V includes the steps of construction of the bottom head section 10 (FIGS. 2A-2D) and mounting of the bottom head onto the vessel foundation VF. Then, the generally cylindrical construction frame or tower F is constructed about the in-place bottom head section 10 in order to form a plurality of vertically spaced, annular work stations W-1, W-2, W-3 and W-4. Substantially simultaneously with the erection of the cylindrical construction frame F, the substantially continuous inside shell liner 11a and top head liner 12a are constructed and welded into position onto the bottom inside head liner 10a. Further, substantially simultaneously with the initiation of construction of the cylindrical construction frame F, the addition of the shell layers 11b begins, with construction of each of the shell layers 11b beginning at or adjacent to the completed bottom head 10, with construction proceeding upwardly in a manner illustrated in FIGS. 3 and 11. In this manner, curved plates 11c are added substantially simultaneously at a plurality of work stations W-1, W-2, W-3 and W-4. Each additional layer to the shell section 11 is applied first to the bottom of the shell section onto the bottom head 10 or adjacent thereto with such layers 11b being constructed upwardly therefrom at each of the work stations W-1, W-2, W-3 and W-4. Some of the layers 11b are continued upwardly onto the top vessel head 12, where the layers thereon are formed of gores 12c (FIG. 11).

METHOD OF CONSTRUCTION OF THE BOTTOM HEAD 10

Referring in particular to FIGS. 2A–2D, a method is illustrated for manufacturing the bottom head 10 which includes the steps of constructing the bottom head 10 in an inverted position wherein the crown portion 10d faces upwardly. It is known to manufacture a vessel head utilizing a hemispherical frame (not shown) which in this instance is mounted onto the cylindrical support 14. After the head inside liner 10a has been welded into place onto such hemispherical frame, the layers of gores 10c are then welded into position. The method of welding the gores into position in a prestressed condition is disclosed in U.S. Pat. No. 3,423,820. A gore positioning apparatus 15 such as that disclosed in U.S. Pat. No. 3,374,935, is utilized to actually hold the gores in position during initial welding. The gore positioning device 15 includes a rotatable support arm 15a mounted onto a center support 15b and including a bottom rolling support means 15c which rollably engages the head cylindrical support 14. In this manner, the rotatable support arm 15a is mounted for circumferential movement about the entire head 10. A hydraulically actuated ram member 16 is mounted onto the radial support arm 15a and includes a piston element which may be moved inwardly to press against a gore 10c being installed as part of a head layer 10b.

After the complete set of layers 10b are installed, a first supporting skirt portion 17 is welded into position onto the inverted, completed bottom head 10. Inverting means generally designated as 18 is then mounted onto the completed bottom head 10 substantially at the center of gravity of the inverted head 10 in order to provide a pivot point for pivoting the completed head 10 to the upright position illustrated in FIG. 2D. The inverting means 18 includes a first A-shaped frame member 18a which includes a pivot shaft 18b which extends into a pivoted connection with one side of the completed head 10. Similarly, the inverting means 18 further includes a second A-shaped frame 18c having a pivot shaft 18d pivotally mounted with the bottom head 10 along the same center of gravity axis of the pivot shaft 18b. Suitable hoist equipment is then utilized to invert the completed head 10 by rotating the head 180° to the upright position illustrated in FIG. 2D. In such upright position, a second, bottom skirt portion 19 is welded onto the bottom of the skirt portion 17 in order to form the total support skirt S, which is mounted on the vessel foundation VF in its final pre-designated location and is provided for supporting the entire vessel V. It should be noted that the bottom vessel head in its upright position provides a plurality of circumferential ledges such as 20a and 20b which are longitudinally spaced from each other such that the exposed ledges at each outside layer is stepped with respect to the adjacent layer.

ASSEMBLY OF SYSTEM T FOR ERECTION OF VESSEL V

Figure 2A:
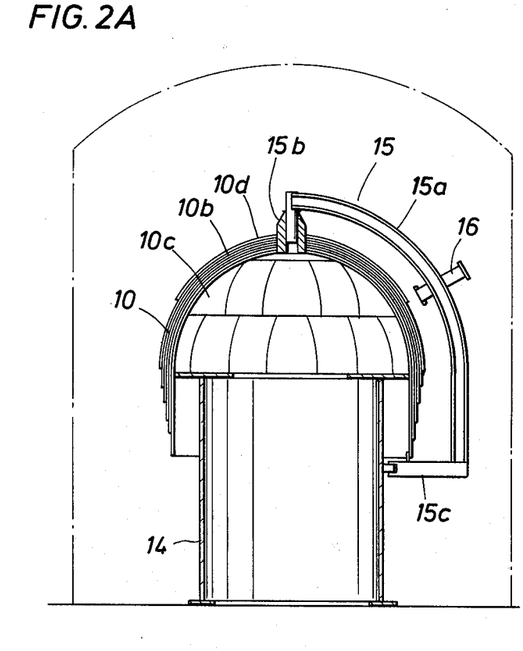
FIGS. 2A-2D illustrate the method of construction and installation of the bottom head section of the layered vessel under construction.
Figure 2B:
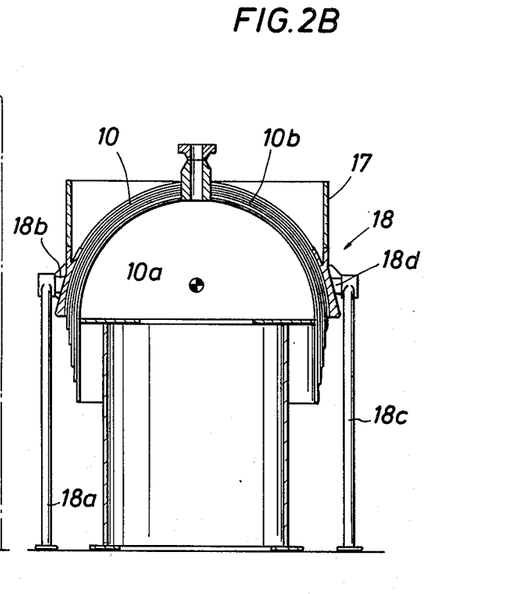
Figure 2C:
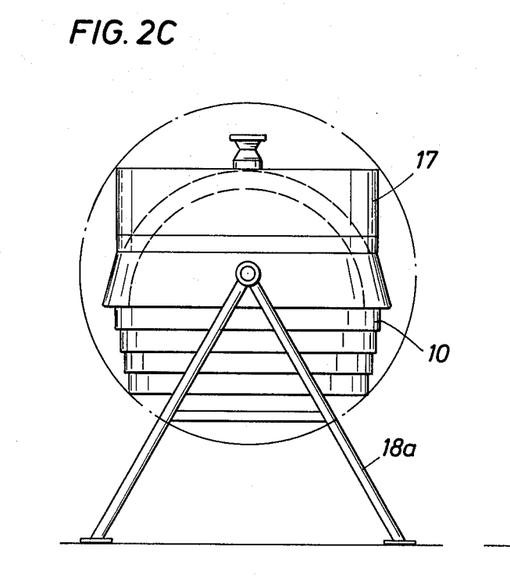
Figure 2D:
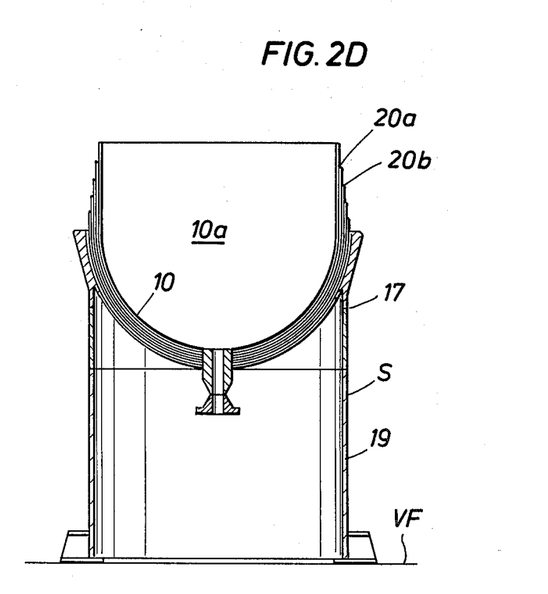

After the bottom head 10 is set in its upright position as illustrated in FIG. 2D, it is necessary to begin the erection of the system T for construction of the remainder of the vessel V. It is first necesary to erect the substantially cylindrical frame F. The frame F comprises a plurality of circumferentially spaced, vertical supports 25 which are circumferentially spaced about the base 19a of the supporting skirt S. Each of the vertical supports 25 is comprised of a plurality of pipe members 25a which are mounted end-to-end through flange connections 25b. The supports are connected to a common roof structure 26 illustrated in FIG. 4. In addition to the circumferentially spaced, vertical supports 25, two additional supports 27a and 27b extend upwardly in a spaced relationship from two adjacent vertical supports 25' illustrated in FIG. 5 for the purpose of providing a vertical shaft area 28 for the elevator E. The elevator shaft 28 is thus adapted to receive plates such as 11c and move them upwardly to one of the various work stations W-2, W-3 or W-4 utilizing an elevator hoist 29 which is attached to a frame assembly 30 mounted onto the top of vertical members 25' and 27a and 27b. The elevator hoist 29 may be of any suitably known type which is capable of safely moving tools and equipment and rectangular, curved plates 11c and gores 12c upwardly and downwardly as is necessary during construction of the vessel V. A suitable siding 31, which may be provided by a frame and siding structure which is connectable to the vertical supports 25, can be utilized should it be necessary to enclose the complete work area. Such a siding 31 is illustrated in FIGS. 1 and 4. The bottom part of the shaft 28 for the elevator E is open to the passageway P so that equipment and material can be moved through the passageway P and upwardly in the elevator shaft 28.

The cylindrical frame F includes a plurality of vertically spaced platforms 35, 36 and 37 mounted onto the circumferentially spaced, vertical supports 25 and cooperating therewith for providing annular work stations W-1, W-2, W-3 and W-4. Each of the platforms 35, 36 and 37 are annular in configuration and are adapted to provide an annular support surface for workers and equipment working in a particular annular space surrounding the vessel V under construction.

Each of the annular work stations W-2, W-3 and W-4 are bounded on the outside by the circumferentially spaced, vertical supports 25, on the inside by the vessel under construction, on the bottom by platforms such as 36 and on the top by the crane assemblies C.

Referring to FIG. 6, the work station W-2 is illustrated in detail. The work station W-2 is bounded by the vertical supports 25 comprised of pipe member 25a, the platform 35, the vessel shell section 11 under construction and the crane assembly C positioned just below the next vertically spaced platform 36.

Each of the platforms 35, 36 and 37 are basically identical except for vertical spacing and thus only the platform 35 will be described in detail. The platform 35 includes a plurality of circumferentially spaced truss members 39 which are bolted onto brackets 40 welded onto the circumferentially spaced vertical support members 25. The truss members 39 extend radially inwardly and have positioned thereon a first platform member 35a, the platform member 35a consisting of a plurality of segmented plates that cooperate to provide an annular support surface. A plurality of upper, movable platform members 35b are bolted onto the basic platform 35a. The platform members 35b are actually a plurality of curved platform segments which are adapted to be bolted onto the basic platform 35a at various radial positions so that the overall radial width of the platform 35 may be adjusted as necessary. For example, whenever the vessel V shell is in the beginning stages of construction such as illustrated in FIG. 3, it is necessary for the platform 35 to be wider so that the platform extends radially inwardly into a position immediately adjacent the layers 11b under construction. As vessel layers are added, it is necessary to adjust the position of upper plates 35b in order to provide annular space for the new layers 11b being added. Additional brackets such as 41 are provided on each of the vertical support members in a common plane in order to allow for vertical adjustment of the spacing between adjacent platforms such as 35 and 36 simply by moving the truss members 39 to different vertical positions and mounting the platform members 35a and 35b thereon.

The pipe members 25a which form the vertical support members 25 are hollow so that utility lines for air, water, electricity and perhaps welding gas lines, may be run through the piping with outlets such as 42 and 43 located near the platforms such as 35 for the annular work station W-2. In this manner, utilities are provided to each of the annular work stations W-2, W-3 and W-4.

There are two crane assemblies C for each of the work stations W-1, W-2 W-3 and W-4. In FIG. 4, one of the crane assemblies C is illustrated for the work station W-3; and, in FIG. 6, one of the crane assemblies C is illustrated for the work station W-2.

The details of the structure of each of the crane assemblies C is best illustrated in FIGS. 5–9. Each crane assembly C is mounted onto an annular support frame 50 which is mounted onto vertical support members 25a just below the next upper platform member 36 (FIG. 6). The annular support frame 50 includes a first annular track member 51 which is basically an L-shaped, annular rail mounted onto the vertical supports 25 by bolting to brackets 52 attached to the pipe members 25a. The annular support frame 50 further includes a second, annular track member 53 which is also L-shaped and is mounted approximately below the first track member 51 onto brackets 54 mounted onto the pipe support members 25a. The first annular track member 51 thus faces radially outwardly, and the second annular track member 53 faces inwardly.

A crane frame generally designated as 55 having attached thereto a hoist 56 is mounted onto the first and second track members 51 and 53 for circular movement within the annular work station W-2. The frame 55 includes two radially directed members 55a having attached therewith diagonally directed or inclined frame members 55b which are interconnected by cross frame supports 55c (FIG. 7). The angled frame members 55b have mounted thereon rollers 55d which are in rolling engagement with the outwardly facing annular track member 51. The radially directed frame members 55a have mounted on the underside, radially outward ends thereof rollers 55e which rollingly engage the inwardly facing annular track surface of the track member 53. In this manner, the frame members 55a and 55b, which are joined in an approximate V-shape as viewed in FIG. 6, are supported for annular movement by means of the rollers 55d and 55e which are mounted on opposingly facing track members so that the position of the entire crane assembly C is balanced.

The crane assembly C further includes a first radial mount means generally designated as 60 mounted with the frame 55 for movement radially with respect to the crane frame 55 and a second radial mount means 61 which supports the hoist member 56 and is mounted for radial movement with respect to the first radial mount means 60. In this manner, the hoist 56 is movable to a first radial position utilizing the first radial mount means 60 and to a second radial position utilizing the second radial mount means 61.

The first radial mount means 60 includes a track member 62 having upwardly extending bracket members 62a which are adapted to bolt to complementary, downwardly depending bracket members 62b mounted onto a suitable frame portion of the frame members 55a (or transverse pieces connecting the frame members together, not shown). The track member 62 is basically an inverted, U-shape as viewed in FIG. 9 and includes side members 62a and 62d having two horizontal rows 63 and 64 of rollers mounted on each of the side members 62c and 62d. An I-shaped, movable track member or telescoping beam 66 includes an upper, horizontal section 66a which is mounted between the horizontal rows 63 and 64 of rollers on the track side members 62c and 62d so that the telescoping bean 66 is mounted for movement with respect to the track member 62.

The telescoping beam 66 further includes a main vertical section 66b and a bottom, horizontal section 66c. The bottom section 66c of the telescoping beam 66 also forms part of the second radial mount means 61. The second radial track means 61 further includes a generally U-shaped movable hoist support assembly 67 (FIG. 9) which is formed of adjacently positioned, triangularly shaped support plates 68 (FIG. 8) which are bolted together at the bottom apex portion 68a by a hoist support 69, which supports the actual hoist 56, which may be any suitable crane hoist. Each of the triangular plates 68 has mounted thereon two rollers 70 which rollingly engage the upwardly facing track portions of the bottom track member section 66c. In this manner, the hoist 56 through the hoist support assembly 67 is mounted for radial movement with respect to the travelling beam 66.

The stationary, upper track member 62 has a central stop member 71 which depends downwardly and is engageable by stop members 72 and 73 which are welded onto and extend upwardly from the top of the upper beam section 66a of the travelling beam 66. In this manner, the radial movement inwardly of the travelling beam 66 is halted by engagement of the stop 73 against stop 71 and, conversely, radial movement of the travelling beam 66 outwardly is halted by engagement of the stop member 72 against the stop member 71.

Radial movement of the hoist 56 through its hoist support assembly 67 along the travelling beam 66 is controlled by stop members 74 and 75 which extend upwardly from both sides of the upper faces of the bottom telescoping beam section 66c.

Thus, the crane assemblies C through the hoist 56 are capable of raising and lowering equipment, plates 11c and gores 12c and in addition, are capable of moving radially inwardly such plates 11c and gores 12c to extended radial positions for placement of the plates 11c against the shell walls or layers 11b under construction. The mounting of the travelling beam 66 for radial movement with respect to the stationary track member 62 provides for radial positioning of the travelling beam itself and the roller mounting of the hoist 56 through the hoist support assembly 67 for relative movement with respect to the telescoping beam or second track member 66 provides for additional relative movement of the hoist 56 with respect to the annularly movable frame portion 55. Thus the crane assembly C is capable of moving objects upwardly, downwardly, annularly and in two steps, to various radial positions.

CONSTRUCTION OF SHELL AND TOP HEAD

Referring again to FIGS. 4 and 11, after the cylindrical frame F has been erected, or even before such erection has been completed, construction of the vessel shell can begin. First, the inside shell liner 11a is welded into position on top of the bottom head liner 10a. Inside liner 12a for the top head is then welded into position onto the shell liner 11a. It is now appropriate to begin the construction of the shell layers 11b. The shell layers 11b are comprised of a plurality of curved, rectangular plates 11c which are welded into position. Construction of each of the layers 11b begins with the addition of curved plates at the circumferential ledges such as 20a and 20b illustrated in FIG. 2d. Construction of the shell layers 11b is from the inside out and proceeds from the circumferential ledges 20a and 20b of the bottom head 10 and proceeds upwardly therefrom. After the initial layers have begun, it is possible for work to several separate layers 11b of the shell 11 to be progressing at a number of the work stations. Typically, the upper work stations are being utilized to apply rectangular plates 11c to layers which are inside of the layers being worked on at the lower work stations since the layers are added beginning at the bottom of the shell section and proceed upwardly therefrom toward the top head interior or inside liner 12a. Since the rectangular plates 11c that are added to form the shell section are all basically the same size, the staggered placement of the initial set of circumferential welds at 20a and 20b at the bottom hemispherical head 10 is actually repeated through at least a part of the shell such that the final, layered shell section will have a plurality of staggered, circumferential welds at vertically spaced intervals along at least a part of the shell section 11. It is necessary to utilize a layer-to-layer alternating weld placement in the area where the shell joins the top head.

The vessel shell layers 11b which are added from the bottom up may be defined in two portions. The first, inside portion comprises those layers which are a continuation of the layers 10b of the bottom hemispherical head. These layers thus begin at the circumferential ledges such as 20a and 20b in FIG. 2D and extend upwardly therefrom. In addition, there is a second portion of layers 11b which begin on the skirt ledge 80 and extend upwardly therefrom. The layers 11b which are a continuation of layers from the bottom shell section 10 also continue as layers 12b in the top head 12. The outer portion of layers 11b which begin on the skirt ledge 80 terminate, as illustrated in FIG. 12, in a series of ledges 81 which are located at the bottom part of the top hemispherical head 12. In a finished form, the ledges 81, due to the overall large size of the vessel V, will have a substantially smooth appearance (FIG. 4).

With respect to the positioning and welding into place of the individual rectangular plates 11c which form the shell section layers 11b, U.S. Pat. No. 4,053,971 discloses a wrapping machine which is used for positioning such plate sections adjacent to one another and placing the plate sections into a loaded condition for welding into place. However, prior to the utilization of the wrapping machine of U.S. Pat. No. 4,053,971, or other similar pressure-applying apparatus, the individual plates 11c must first be positioned upon already welded, lower plates in the same layer. Referring to FIG. 6, a guide means generally designated by the number 85 is provided for initially positioning the rectangular, curved plate 11c onto the upper edge 82 of the already positioned and welded rectangular plate 11c therebelow (FIGS. 10A and 10B). The guide means 85 includes one or more guide segments or members 86 which are held in place against the already positioned lower plate 11c by a suitable band 87. The guide members 86 include a vertical portion 86a and an angled portion or ledge 86b which is angled outwardly to provide an inclined guiding surface or ledge 86c adapted to receive the lower edge of the plate 11c being moved into position utilizing the crane assemblies C. A plurality of spacers 88 (FIG. 10A) are mounted onto the upper ledge 82 of the installed plate 11c to support the lower edge of the plate 11c being installed. In this manner, proper spacing for welding purposes is assured. After the plate 11c has been positioned against the next adjacent inner plate and is resting firmly on the spacers 88 supported by the upper ledge 82 of plate 11c therebelow, a banding machine such as that disclosed in U.S. Pat. No. 4,053,971 is moved in position about the newly installed plate 11c for the purpose of pressing that plate into a position for welding. Utilizing the crane assemblies C, the new plates 11c can be installed completely about the annular work stations such as W-2, this procedure being repeated along the length of the vessel and with each succeeding outer layer until the shell section is completed.

Referring to FIGS. 13, 14A and 14B, the branch outlet or nipple 90 represents any of the branch outlets illustrated in the shell section 11 of the vessel. The branch outlet 90 is designed to receive a flange member 91 for eventual attachment to fluid lines in the system in which the vessel V is to be utilized. Referring to FIG. 13, the branch outlet 90 is first welded into position in the shell liner 11a either before or after that liner 11a has been mounted onto the bottom head inside liner 10a. The individual layers 11b of plates 11c are then added to the liner about the branch outlet 90 with each individual plate being cut to fit the configuration of the branch outlet 90 (FIG. 14A). In this manner, the branch outlet 90 is welded one layer at a time to the plate members 11c, thus avoiding the need for more complicated, multi-layer welding methods which are in more common use today.

SUMMARY

After initial construction and completion of the bottom head 10 and rotation of the bottom head to the upright position illustrated in FIG. 2D, the generally cylindrical frame or tower F is built. As the frame F is built, work stations such as W-1 and W-2 are formed utilizing the vertically and radially adjustable platforms 35. Each work station such as W-2 and W-3 are annular in shape and are defined on the bottom by platforms such as the platform 35 and on the top by two crane assemblies C which are mounted for annular movement within the annular work stations. The individual plates 11c are added to the shell section beginning at the staggered bottom head weld ledges such as 20a and 20b. Due to the individual plates 11c being added to the shell section being of substantially the same size, the staggered weld configuration which begins with the ledges 20a and 20b is repeated throughout the length of the shell section 11. The individual plates 11c are added at the ledges such as 20a and 20b so that the interior layers continue from the bottom head into the shell 11 and then from the shell into the top head 12. In addition, layers are mounted onto the upper ledge 80 of the skirt S and continue upwardly therefrom. The method of addition of the individual plates 11c from the bottom allows for welding operations to be carried on at each of the work stations W-1, W-2, W-3 and W-4 virtually simultaneously, including work in the adding of gores 12c to form the top head 12, wherein the same gore-applying equipment 15 is utilized as was used to manufacture the bottom head 10. The procedure for the plates nad gores is as follows: Each plate is cut to final dimension and curvature in the fabrication building B, which may be located immediately adjacent to the passageway P or remote therefrom. The plate is then moved through the passageway P and upwardly in the elevator E to one of the work stations W-1, W-2, W-3 or W-4. The crane assemblies C are then connected to the plate and a transfer of load is made from the elevator hoist 29 to the hoist 56 of each of the two crane assemblies C. The plate is then moved into position utilizing the plate guide means 85 illustrated in FIG. 6 and is finally welded into position. This operation is repeated at virtually all of the work stations substantially simultaneously until the shell section 11 is completed. In the meantime, work can begin and continue on the layers 12b for the top head section 12 such that many areas of the vessel V can be worked substantially at the same time.

The foregoing disclosure and description of the invention are illustrative and explanatory thereof, and various changes in the size, shape and materials as well as in the details of the illustrated construction may be made without departing from the spirit of the invention.

We claim:

1. Method of construction of a layered vessel on final location, comprising:
   construction of a bottom head section and mounting of said bottom head section on a vessel foundation;
   erection of a generally cylindrical construction frame about said bottom head, said construction frame extending upwardly to substantially the height of the vessel to be constructed;
   providing with said construction frame a plurality of vertically spaced, annular work stations;
   substantially simultaneously with erection of said cylindrical construction frame, constructing onto said bottom head a cylindrical shell liner and a hemispherical inside, top head liner mounted on said cylindrical shell liner;
   utilizing said annular work stations, initiating construction of said shell layers by welding in place a plurality of curved plates from the bottom head upwardly;
   adding layers of such curved plates to said shell from the bottom head upwardly with the addition of such layers occurring substantially simultaneously at various of said annular work stations, with each additional layer being started at said shell portion adjacent to said bottom head; and
   continuing some of said layers as they are completed on said shell onto said top head by the addition of layers of gores thereto.

2. The method set forth in claim 1, including:
   providing an elevator shaft adjacent to said annular work stations for the movement of plates upwardly into said work stations; and
   positioning said plates into position for welding at said work stations by circumferential and radial movement with respect to said vessel being constructed of said plates.

3. The method set forth in claim 1, including:
   positioning a curved shell plate for welding by first landing the bottom edge of such plate on spacers mounted on the top edge of the shell plate already installed and located immediately below the plate being positioned; and
   providing a guide and retaining wall positioned against said already installed plate, which guide and retaining wall extends upwardly and angles outwardly from the upper edge of said plate.

4. The method set forth in claim 1, wherein:
   an outlet for said vessel shell is positioned and welded into said inside shell liner prior to the construction of any layers of plates about said outlet; and
   plates of each layer successively added about said outlet are configured to fit about said outlet and welded to said outlet one layer at a time.

5. The method set forth in claim 1, wherein said bottom head is manufactured and positioned in the following steps:
   constructing said bottom layered head with the crown portion facing upwardly;
   mounting onto the completed bottom head a support skirt; and
   inverting said completed bottom head and skirt to place said bottom head in its supported upright position.

6. The method set forth in claim 1, including:
   providing each work station with movable floor portions which are adjusted radially outwardly as layers of said shell are completed.

7. The method set forth in claim 1, including the step of:
   adding additional layers to said shell at more than one work station substantially at the same time, with the lower work stations applying plates to layers further outwardly from said inside shell than the layers being applied at higher stations at substantially the same time.

8. The method set forth in claim 1, including:
   constructing certain shell layers as a continuation of layers of said bottom head and thereafter continuing such layers onto said top head.

9. The method set forth in claim 5, including the step of:
   inverting said bottom head by pivoting said bottom head about a center of gravity.

10. The method set forth in claim 1, including the step of:
    joining layers of said shell to layers of said bottom head at circumferential welds which are staggered longitudinally from layer to layer.

* * * * *